United States Patent [19]

DuBell

[11] 4,302,941
[45] Dec. 1, 1981

[54] COMBUSTER LINER CONSTRUCTION FOR GAS TURBINE ENGINE

[75] Inventor: Thomas L. DuBell, Lake Park, Fla.

[73] Assignee: United Technologies Corporation, Hartford, Conn.

[21] Appl. No.: 136,631

[22] Filed: Apr. 2, 1980

[51] Int. Cl.³ .................. F23R 3/44; F23R 3/60
[52] U.S. Cl. ............................................. 60/757
[58] Field of Search ............ 60/757, 755, 756, 39.32

[56] References Cited

U.S. PATENT DOCUMENTS

| | | | |
|---|---|---|---|
| 2,268,464 | 12/1941 | Seippel | 60/757 |
| 2,609,040 | 9/1952 | Aronson | 60/757 |
| 2,617,255 | 11/1952 | Niehus | 60/757 |
| 2,918,793 | 12/1959 | Jerie et al. | 60/755 |
| 2,919,549 | 1/1960 | Haworth et al. | 60/755 |
| 4,236,378 | 12/1980 | Vogt | 60/757 |

*Primary Examiner*—Robert E. Garrett
*Attorney, Agent, or Firm*—Norman Friedland

[57] ABSTRACT

This invention relates to the counter-parallel cooling flow for a combustor liner with means for loosely mounting one of the two spaced liner walls relative to the other to support it so that it "floats". The counter-paralled flow provides both convenctive and film cooling permitting the floating wall to be in axially spaced segments relative to the flow of combustor air. The floating wall is segmented in the circumferential direction to permit relatively minimal stress during thermal expansion.

9 Claims, 4 Drawing Figures

COMBUSTER LINER CONSTRUCTION FOR GAS TURBINE ENGINE

CROSS REFERENCE

This invention is related to the invention disclosed in copending patent applications entitled COMBUSTOR LINER CONSTRUCTION and COMBUSTOR LINER CONSTRUCTION, filed by I. S. Tanrikut, W. B. Wagner, I. Segalman and P. Goldberg; and H. M. Craig, W. B. Wagner and W. J. Strock, respectively, on even date and both assigned to the same assignee of this application.

TECHNICAL FIELD

This invention relates to combustor liners for gas turbine engines and particularly to a counter-parallel flow construction that embodies a "floating" wall.

BACKGROUND ART

Certain state of the art gas turbine engines, as the TF-30 manufactured by Pratt & Whitney Aircraft Group of United Technologies Corporation, the assignee of this patent application, utilize Finwall ® material as the basic materials for fabricating the liner wall. For further details of Finwall material reference should be made to the TF-30 engine, supra, and U.S. Pat. No. 3,706,203 granted to P. Goldberg and I. Segalman on Dec. 19, 1972. For the purpose of this description, suffice it to say that Finwall material comprises a pair of spaced walls formed in cylindrical bodies and attached end over end in louver fashion to form the combustion chamber. Either parallel depending walls extending in a gratelike fashion from one wall interconnect the other wall and define therewith a plurality of open-ended longitudinal passageways. Because of the louver construction, the upstream end accepts cooling air from the surrounding space and discharges it from the passageways at the downstream end into the combustion chamber. Succeeding louver sections pick up and discharge the cooling air in a like manner.

The above cross-referenced patent application modifies the Finwall constructed liner, by providing inlet openings intermediate the ends of the Finwall material and conducts the cooling air in a counter and parallel flow relation to the combustion products. This not only serves to improve the temperature gradient along the longitudinal and radial directions it permits spacing the segments inasmuch as the discharge cooling air film cools the transition zones.

I have found that I can not only take advantage of the cooling features mentioned above, but I can obtain even extended liner life by not attaching the hotter liner wall member to the cooler one thereby allowing it to float. Further cooling is obtained by extending the downstream end of the floating wall to define a lip and thereby reestablishes a film of cooling air for improved film cooling of the transition section. It is contemplated within the scope of this invention that the hot liner wall is segmented in both the axial and circumferential direction. The axial segments are sufficiently spaced whereby film cooling provides adequate cooling between axial segments and the space between segments in the circumferential direction permits circumferential growth. The circumferential growth negates the possibility of radial growth and minimizes detrimental thermal stress and leaves the cooling flow passages relatively undisturbed. Each segment may be secured relative to the cool wall by a nut and bolt arrangement designed to achieve minimum stresses.

DISCLOSURE OF THE INVENTION

An object of this invention is to provide for a gas turbine power plant an improved liner for its combustor. A feature of the invention is to provide a segmented annular hot wall member having longitudinal passages loosely mounted in parallel relationship whereby the hot wall can thermally expand relative to the cooler wall without imposing undue stresses and hence negate the possibility of both walls engaging into a thermal fight.

Another feature of this invention is to extend the downstream end of the hot liner wall relative to the flow combustion products to define a lip for reestablishing a film of cooling air to improve cooling of the transition zones.

Another feature of this invention is to utilize tubes for dilution and combustion air discreetly located in the transition zones. An annular segment in the hot side of the downstream end of the tube may be extended to define a lip for providing a film of cooling air for improved cooling.

The improved combustor liner is characterized by increasing the longevity of the liner without increasing the weight and complexity thereof and yet reducing expense for making the same as compared to heretofore known liners.

Other features and advantages will be apparent from the specification and claims and from the accompanying drawings which illustrates an embodiment of this invention.

BRIEF DESCRIPTION OF THE DRAWINGS

FIG. 3 is a bottom view partly broken away showing the arrangement of the dilution and combustion air holes.

BEST MODE FOR CARRYING OUT THE INVENTION

It is contemplated within the scope of this invention and which will appear obvious to one ordinarily skilled in the art that the liner envisioned in this invention can be utilized in a can, annular or combination thereof combustor. For further details of combustors utilizing Finwall material in the liner, reference is made to the TF-30 engine supra.

Figure 1:
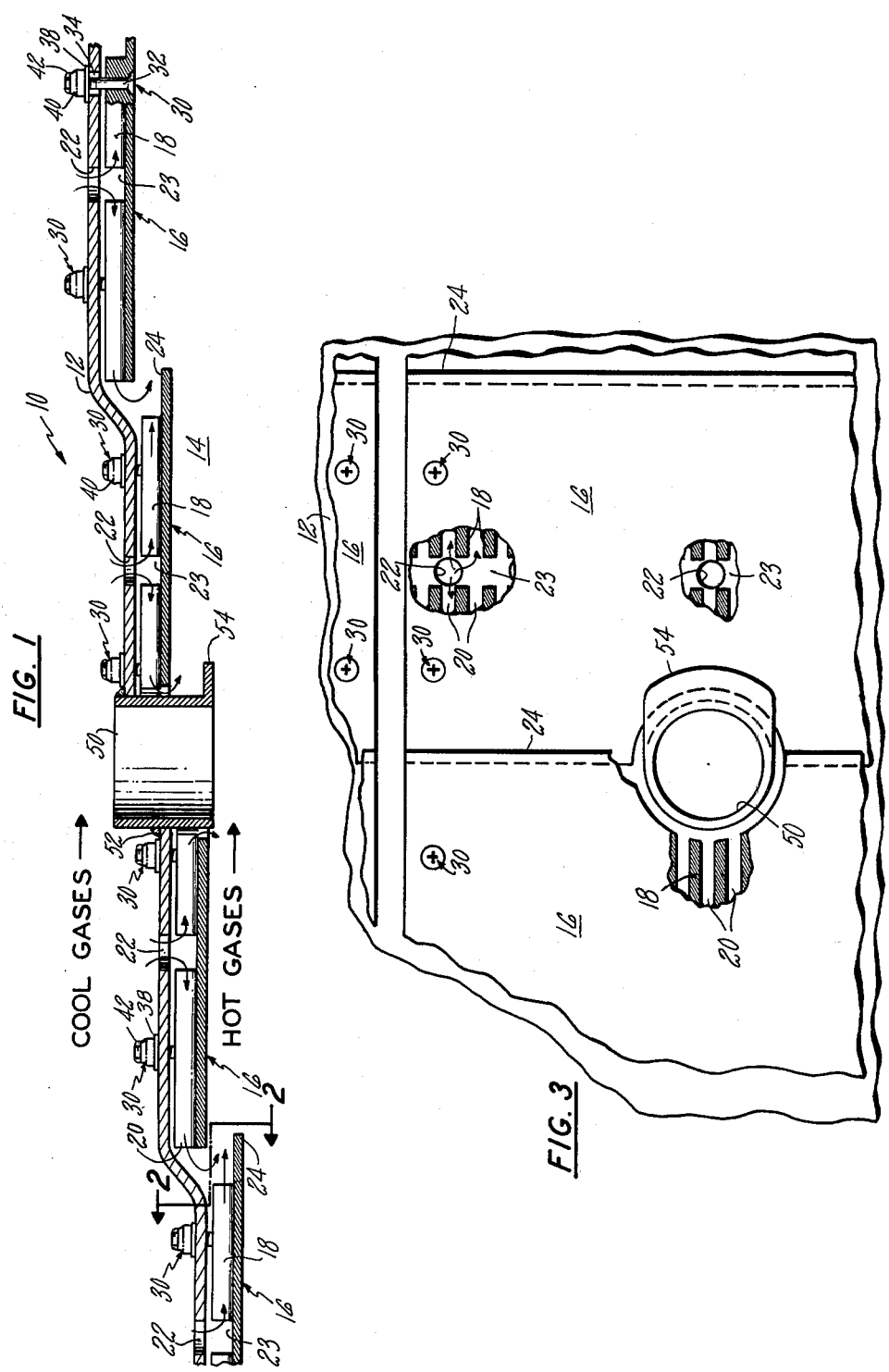
FIG. 1 is a partial view of a combustor liner in section illustrating the details of this invention.
Figure 2:
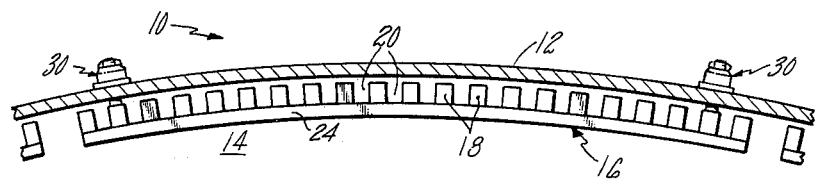
FIG. 2 is a section taken along line 2—2 of FIG. 1.

As noted from FIGS. 1-3 (inclusive) the liner generally illustrated by reference numeral 10 comprises an outer annular wall 12 configured to define the combustion chamber 14 wherein combustion ensues. As noted therein the hot combustion gases flow in the direction indicated by the arrow referenced therein. The generally cylindrical outer wall as noted is stepped into conical shaped sections to define a louver configuration which will be described in more detail hereinbelow.

In accordance with this invention, a plurality of annular radial spaced segmented walls 16 are loosely attached to the outer wall 12 and each of these segments 16 carry a plurality of longitudinally spaced walls 18 extending radially toward the inner diameter of outer wall 12 but not attached thereto. Walls 18 define longitudinal passages 20 that extend in the direction of the flow of hot gases in the combustor.

As will be appreciated from the foregoing, cooling air (discharging from the compressor) from the cavity surrounding liner 12 admitted into a plurality of inlet openings 22 and circumferential slots 23 which are located intermediate the ends of the longitudinal passages 20 serve to manifold cooling air so that a portion thereof flows into longitudinal passages 20 counter to the hot combustion gaseous flow and a portion flows into the other longitudinal passages 20 parallel thereto. The cooling air flowing in these passages effectively picks up heat by convection which is discharged in the upstream and downstream transition zones to effectuate film cooling.

To enhance film cooling, the inner wall is extended beyond the longitudinal passages 20 on the downstream end to define lip 24. The discharging flow thusly is formed into a film for effectually film cooling the adjacent transition zone.

As can be seen by the direction of flow indicated by the arrows, cooling air leaving the longitudinal cooling passages 20 forms a protective film along the transition surfaces. Because of the hostile environment, the film discharging at the downstream end of the passages 20 dissipates along a relatively short expanse. To maintain the film as far along the axial length of the line and over the underneath surface of the hot liner wall, the discharging flow upstream at the upstream end of the passage commingles with the flow from the downstream end within the lip 24 and reestablishes the film to form a protective film under the surface of the hot liner wall 16.

To assure that the inner wall 16 and its attendent longitudinal walls 18 depending therefrom do not bear against the outer wall 22 upon thermal expansion and deformation, it is preferred that the segmented hot liner walls are segmented in the circumferential direction. Thus, as shown in FIG. 3, the inner liner walls 16 are spaced circumferentially around the outer liner wall 12 encircling the liner with a convective heat exchange of parallel and counter flow of cooling air with the combustion products.

The inner liner 16 is loosely retained by a suitable number of attachments which may take any well known form. As shown each panel is secured in place by four nut and bolt assemblies 30. The bolt or stud 32 is counter sunk into the hot wall 16 and extends through complimentary opening 34 formed in cooler wall 12. The diameter of opening 34 is wider than the shaft of stud 32 to allow for circumferential thermal growth. A washer 38 is sandwiched between wall 12 by a suitable commercially available self locking nut 40. The nut may be tack welded to the end of bolt 32 as indicated by weldment 42.

One of the critical areas in the liner where high stress concentration is likely is in the locations of the dilution and combustion air holes. In its preferred embodiment, this invention contemplates locating these holes in the transition zones of the liner as shown in FIG. 3. To achieve effective cooling without disturbing the velocity of the cooling air in the longitudinal passages in the path of these holes, a tube member 50 is inserted into the hole and extends into the combustion chamber 14. The tube may be tack welded to the cool liner wall 12 as shown by weldment 52. To further enhance cooling, lip 54 is formed on the downstream segment of tube 50 so that air egressing from the upstream end of longitudinal passage 20 impinges on the side wall of the tube 50 and turns into the direction shown by the arrow and reestablishes a film to form a protective cool air film over that portion of the under surface of wall 16 in proximity thereto.

Figure 4:
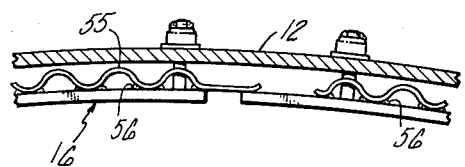
FIG. 4 is a partial view in section showing an alternate construction of using fins to define the longitudinal cooling passages.

FIG. 4 exemplifies the floating wall construction when fins defining the longitudinal passages are utilized instead of the depending walls. As noted, the fins 55 are tack welded to the outer surface of hot liner wall 16, (like reference numerals depicting like parts) as shown by weldments 56 and are spaced from wall 12. The edge of fins 55 adjacent the segments 16 extends over the space between segments and is unattached. This assures that the walls can thermally grow without imposing undue stresses.

By floating the wall as described above and by adopting these improvements in the cooling effectivenss of the liner, it has been analytically assessed that the life of a liner constructed in accordance with this invention can be increased substantially four times.

It should be understood that the invention is not limited to the particular embodiments shown and described herein, but that various changes and modifications may be made without departing from the spirit and scope of this novel concept as defined by the following claims.

I claim:

1. A combustor liner for a gas turbine engine which has a compressor, said liner comprising an outer liner wall generally configured in a cylindrical shape defining a combustion zone, axially spaced concentrically disposed segmented ring elements having longitudinal projecting fingers extending toward but short of said outer liner wall defining an inner wall relative to said combustion zone, said fingers defining open ended longitudinal passages circumscribing said outer wall, an inlet for leading cooling air from said compressor intermediate the ends of said longitudinal passages so that a portion flows counter to and the remainder flows parallel to the flow of the combustion products, means for floating the inner wall so that it moves concentrically relative to said outer wall to minimize thermal stresses ocassioned during the firing of the combustor, said means includes attachment means extending from said inner wall through said outer wall.

2. A combustor liner as claimed in claim 1 wherein said fingers of said segmented ring elements extend short of said downstream end of said inner wall to define a lip for reestablishing a film of cooler air discharging from said longitudinal passages.

3. A combustor liner as claimed in claim 2 wherein said cylindrical liner is stepped into conically shaped portions extending between segmented inner liner walls, said lip extending into said conically shaped portion.

4. A combination as in claim 4 wherein the cooling air discharging from adjacent segmented ring elements commingles at said lip to reestablish film cooling of the space between adjacent ring segments.

5. A combination as in claim 3 wherein said liner includes combustion and dilution air holes disposed in said liner at the conically shaped portions.

6. A combustor as in claim 5 wherein at least one of said combustion of dilution air holes includes a tubular member attached to said outer wall and extending into the combustion zone, a flange extending generally parallel to said outer wall on the downstream end of and semi-circumscribing said tubular member for defining a lip for reestablishing a film of cool air egressing from the longitudinal passages of the downstream ring element adjacent said tube through a space formed therebetween.

7. A combustor liner for a turbine type power plant comprising a first generally cylindrical wall means configured in a shape to confine combustion, a plurality of axially spaced segmented generally concentric second wall means disposed radially inwardly from the inner diameter of said first wall means, inwardly projecting spaced wall means extending a distance short of said first wall means from the outer diameter of said second wall means and defining longitudinal passages, openings in said first wall means intermediate the upstream and downstream ends of each of said second wall means for leading a portion of cooling air from a cavity surrounding said first wall means in a counter flow direction and a portion in a parallel flow direction relative to the flow of combustion products, means for supporting said second wall means to said first wall means in a floating relation whereby said second wall means moves relative to said first wall means while imparting a minimal thermal stress taken up primarily through the supporting means.

8. A combustor liner as in claim 7 including at least one fastener having a shaft extending from the second wall through an opening in said first wall and having a wider diameter than the shaft for relative circumferential movement therein and means for securing said fastener for permitting thermal circumferential growth without imparting a stress from one wall to the other wall.

9. A combustor liner as in claim 8 including stepping said cylinder wall into conical shaped portions disposed between axially spaced segments.

* * * * *

UNITED STATES PATENT AND TRADEMARK OFFICE
CERTIFICATE OF CORRECTION

PATENT NO. : 4,302,941

DATED : December 1, 1981

INVENTOR(S) : Thomas L. Du Bell

It is certified that error appears in the above-identified patent and that said Letters Patent are hereby corrected as shown below:

Column 4, Line 65   "of" should read --or--

Column 4, Line 57   "claim 4" should read --claim 3--

Signed and Sealed this

Fifth Day of October 1982

[SEAL]

Attest:

GERALD J. MOSSINGHOFF

Attesting Officer   Commissioner of Patents and Trademarks